Figure 2:
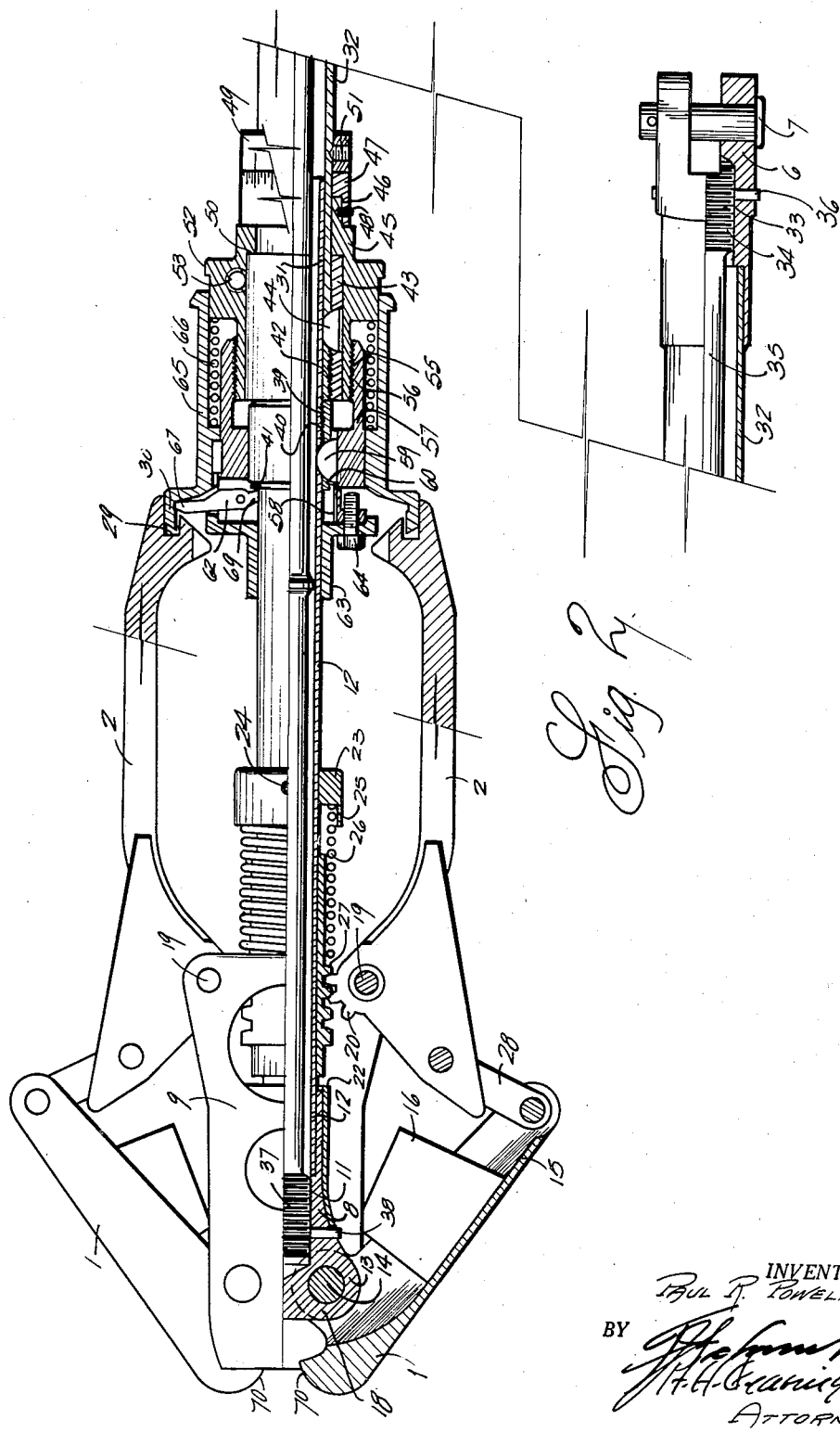

Aug. 5, 1958
P. R. POWELL
2,845,677
HOLDBACK AND RELEASE UNIT
Filed Dec. 7, 1956
2 Sheets-Sheet 1
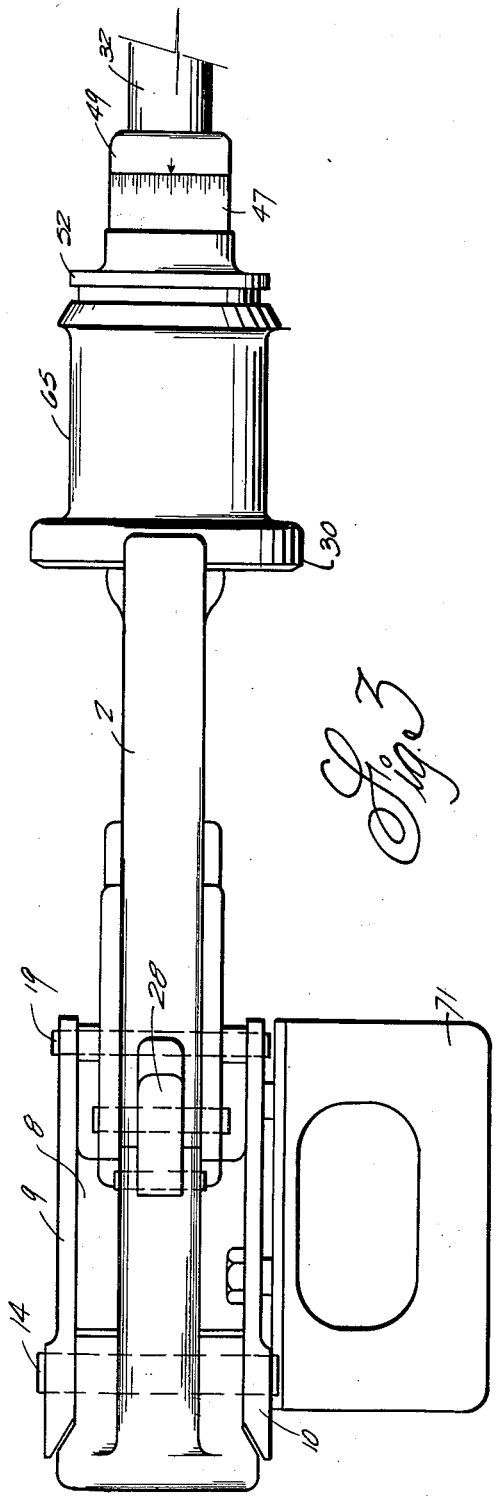
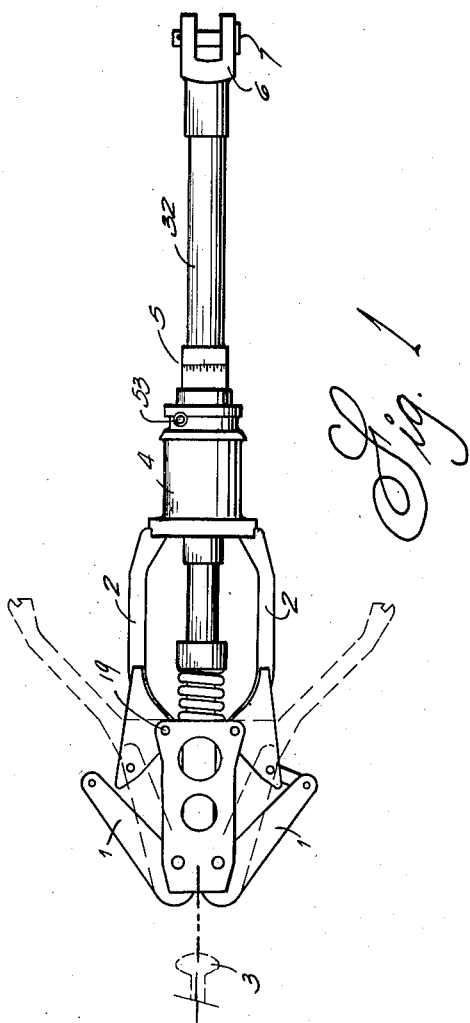
INVENTOR.
PAUL R. POWELL
BY
ATTORNEYS Aug. 5, 1958

P. R. POWELL 2,845,677

HOLDBACK AND RELEASE UNIT

Filed Dec. 7, 1956

2 Sheets-Sheet 2

INVENTOR.
PAUL R. POWELL

BY

ATTORNEYS

United States Patent Office 2,845,677
Patented Aug. 5, 1958

2,845,677

HOLDBACK AND RELEASE UNIT

Paul R. Powell, Baltimore, Md., assignor, by mesne assignments, to the United States of America as represented by the Secretary of the Navy Application December 7, 1956, Serial No. 627,084

5 Claims. (Cl. 24—201)

This invention relates to a holdback and release mechanism and has particular application in association with aircraft catapults.

The operation of aircraft from comparatively small areas as encountered in naval aircraft carriers requires the use of catapults. It is necessary, in the operation of the catapult, that the launching means and aircraft be restrained until a predetermined thrust force is reached. At that instant, it is desirable to have the launching means and the aircraft automatically released. This invention provides a holdback and release means that can be set to release the aircraft at any desired predetermined thrust.

The present service model holdbacks release by the breaking of links or rods. This constant breaking results in a steady cost to the Government. Also, the constant breaking results in a dangerous hazard to personnel and equipment occasioned by the shattering, flying particles. The instant invention overcomes these drawbacks.

The instant invention comprises a holdback capable of repeated use. One end of the holdback has a pair of jaws that clamp around a fitting on the plane. The other end of the holdback fastens to a link which locks into a cleat in the deck of the carrier. As the tension is increased by the force of the launching means and the aircraft, a rod in the holdback elongates to trigger a mechanism to release the jaws and allow the aircraft to be launched.

It is an object of this invention to provide a holdback and release unit capable of repeated use.

It is a further object of this invention to provide a holdback and release unit that can be adjusted to be responsive to a variety of predetermined thrusts.

It is a further object of this invention to provide a holdback and release unit that is trigged by the elongation of a tension rod.

Other objects and many of the attendant advantages of this invention will be readily appreciated as the same becomes better understood by reference to the following detailed description when considered in connection with the accompanying drawings wherein:

Figure 1 is a top plan view of the device.
Figure 2 is a partial-cross-section and perspective view.
Figure 3 is a side elevation.

In Figure 1, the holdback and release unit is generally shown. At one end a pair of gripping jaws 1 are adjusted by the handles 2 to fit over a fitting 3 on an airplane. A releasable catch sleeve 4 holds the jaws in closed position. The sleeve may be set to release at any desired thrust by the adjustment scale and mechanism 5. The other end of the unit has a bifurcated section 6 and pintle 7 for securing the holdback to a deck cleat.

The end of the holdback that is attached to the aircraft fitting 3 is clearly shown in Figures 1 and 2. A central body 8 having an enlarged upper plate 9 and an enlarged lower plate 10, contains a central threaded bore 11. The open end of the bore 11 is enlarged to receive a hollow tube 12. At the other end the body is provided with a pair of ears 13 with openings for receiving pivot pins 14 which pass through aligned openings in the plates.

Each of the jaws 1 is provided with a longitudinal extending recess 15 in which is mounted a rubber shock absorber 16. A curved extension 18 having openings receives the ear 13 in the recess 15 so that the jaw 1 is pivotally supported on the body 8 and the plates 9 and 10. The jaws 1 are operated by the handles 2 which are pivotally mounted between the plates 9 and 10 at 19. Each of the handles 2 is formed with a gear segment 20 adjacent the pivot. This gear segment is in engagement with a rack 21 which is slideably mounted on the tube 12. A boss 22 on the body 8 limits the movement of the rack in one direction. An adjustable stop 23 having a set screw 24 is mounted on the tube 12. A hollow cup portion 25 receives one end of a spring 26. The other end of the spring 26 abuts against the shoulder 27 on the rack. The spring 26 acts to urge the handles 2 toward the tube 12. Movement of the handles 2 is transmitted to the jaws 1 by mounted links 28 which are pivotally mounted in recesses on the handles and the jaws. Thus, the action of the spring 26 tends to maintain the jaws 1 in a closed position. The handles 2 are each formed with a cut-out 29 to receive the lip 30 of the catch sleeve 4.

The end 31 of the tube 12 is telescopingly received in one end of the tube 32. At the other end, the tube 32 is secured to the clevis 6. A pintle 7 passes through openings in the clevis 6 so that the clevis may be secured to a deck cleat, not shown. The clevis 6 has a central threaded opening 33 for receiving one threaded end 34 of the tension rod 35. A lock pin 36 holds the rod 35 securely to the clevis. The tension rod 35 extends along the interior of tubes 32 and 12 and its other end 37 is threadedly secured in the threaded bore 11. A lock pin 38 holds the tension rod securely in the bore 11.

Between the clevis 6 and the jaws 1, the release mechanism is located. Adjacent to but spaced from the end 31, the tube 12 is externally threaded at 39 for receiving the internally threaded stop 40 having abutment shoulders 41. The tube 32 abuts against the end of stop 40 and is itself externally threaded at 42 for receiving the internally threaded bearing 43. A locking key 44 secures the bearing 43 in proper position. An adjusting collar 45 is rotatably mounted on the bearing 43. At one end the adjusting collar 45 has a shoulder portion 46 on which is secured the scale 47 by set screw 48. The scale 47 rotates with the collar 45 between the stop 49 and the shoulder 50. A set screw 51 holds the stop in position.

The central portion of the collar 45 has a circular flange 52 for easier turning. A locking screw 53 holds the collar in adjusted position. At its other end, the collar 45 is externally threaded at 55 to receive the internal threads 56 of the cam carrier 57. The carrier 57 has an internal slot 58 that receives the key 59 that is held in position in a recess 60 in the stop 40 and tube 12. The key 59 allows longitudinal but non-rotational movement of the carrier 57. Adjacent the other end, the carrier 57 has a cut out portion 61 in which is pivotally mounted the cam 62. A cover 63 is secured to the carrier 57 by bolts 64.

A sleeve 65 is slideably mounted on the collar 45 and the carrier 57. A spring 66 mounted in recesses formed in the collar 45 and the sleeve 65 urges the sleeve toward the cam 62. At the one end the sleeve is formed with a catch lip 30 that is received in the cut-out portions 29 of the handles 2. One end 67 of the cam 62 bears against the surface 68 on the sleeve and the other end 69 of the cam bears against the abutment 41. Thus, as the abutment 41 moves toward the jaws 1 the cam 62 moves the lip 30 out of the cut-out 29.

The holdback and release unit operates to hold an aircraft and launcher in position until a predetermined thrust is reached. The holdback is first secured to the ship by the pintle 7 which mounts the clevis on a deck cleat. The sleeve 65 is manually retracted to release the handles 2. Upon the release of handles 2, they are moved outwardly to the dotted line position in Figure 1 which opens the arcuate tips 70 of jaws 1 so that they may encompass the fitting 3 on the aircraft. The handles are then moved inwardly to be held in position by the lip 30 on the sleeve 65. Next the collar 45 is rotated until the desired thrust appears on the scale 47 and is then locked in position by screw 53. Rotation of the collar 45 moves the cam carrier 57 longitudinally so that the lip 30 fits a different distance within the cut-out 29. Thus, a different thrust is necessary to move the lip 30 out of the cut-out 29.

As force is applied to the launcher and the aircraft's engines are started, the pull on the jaws 1 is increased. The force acts on the tension rod 35 causing it to elongate. As the rod 35 elongates, it moves the body 8 and tube 12 along with it. The stop 40 on the tube 12 moves with the tube and the abutment 41 on the stop begins to rotate the cam 62 which moves the catch lip 30 out of the cut-out 29. When the predetermined thrust is reached by the launcher and the aircraft, the catch lip 30 is completely out of the cut-out 29. The force on the jaws 1 then causes them to open and the aircraft is released. The shock of the release is cushioned by the rubber shocks 16. A rubber pad 71 (Figure 3) absorbs the shock as the device falls to the deck following the release.

Obviously many modifications and variations of the present invention are possible in the light of the above teachings. It is therefore to be understood that within the scope of the appended claims the invention may be practiced otherwise than as specifically described.

What is claimed is:

1. A holdback and release unit comprising a pair of telescoping tubes, a body at one end of one of the tubes, a pair of jaws pivotally mounted on the body, a clevis at one end of the other tube, a tension rod mounted in the tubes and joining the body and the clevis, means for retaining the jaws in engagement with a fitting on an aircraft and means responsive to the tension rod for releasing the retaining means.

2. A holdback and release unit comprising a pair of telescoping tubes, a body at one end of one of the tubes, a pair of jaws for engaging an aircraft fitting pivotally mounted on the body, a pair of handles pivotally attached to the jaws and controlling the position of the jaws, a clevis at one end of the other tube, a tension rod mounted in the tube and joining the body and the clevis, means mounted on the first tube for urging the handles toward the tube, means for releasably retaining the handles adjacent the first tube and maintaining the jaws in a closed position and means responsive to the elongation of the tension rod for releasing the retaining means.

3. A holdback and release unit adapted for releasable engagement with an aircraft fitting or the like comprising a pair of telescoping tubes, a body member carried by one of said tubes at one end thereof, a pair of jaws pivotally mounted on said body member and being movable between open and closed positions relative to said aircraft fitting, a pair of handles pivotally mounted on said body member for controlling the position of said jaws, resilient means mounted on said one tube for urging said handles toward said one tube and thereby urging said jaws toward said closed position, catch means slideably carried by the other of said tubes for holding said handles in a predetermined position to thereby hold said jaws in said closed position, means on said other tube for pivotally securing said other tube in a fixed location, a tension rod connecting said body member and said means on said other tube, and release means associated with said one tube for releasing said catch means from said handles in response to a predetermined elongation of said tension rod to thereby effect the movement of said jaws toward said open position and permit the release of said aircraft fitting therefrom.

4. A holdback and release unit as claimed in claim 3 wherein said release means comprises a cam carrier mounted on said one tube, a cam carried by said carrier, and an abutment mounted on said one tube for engaging said cam and releasing said catch means from said handles upon the elongation of said tension rod.

5. A holdback and release unit as claimed in claim 4 further including a rotatable collar mounted on said other tube, means for preventing longitudinal movement of said collar, means mounted on said one tube for allowing longitudinal adjustment of said cam carrier, and means connecting said collar and said cam carrier so that said cam carrier is adjusted longitudinally as said collar is rotated.

References Cited in the file of this patent

UNITED STATES PATENTS

| 1,277,058 | Garford | Aug. 27, 1918 |
| 2,284,145 | Hansmann | May 26, 1942 |
| 2,541,356 | Hansmann | Feb. 13, 1951 |